United States Patent [19]

Patel

[11] 4,257,295
[45] Mar. 24, 1981

[54] MULTIPLE PURPOSE CUTTER APPARATUS

[75] Inventor: Jayantilal S. Patel, El Monte, Calif.

[73] Assignee: Eubanks Engineering Co., Monrovia, Calif.

[21] Appl. No.: 14,933

[22] Filed: Feb. 26, 1979

[51] Int. Cl.³ .............................................. B26D 1/08
[52] U.S. Cl. ........................................ 83/374; 83/208; 83/282; 83/420; 83/422; 83/628; 83/635
[58] Field of Search ................ 83/208, 262, 283, 282, 83/628, 635, 422, 374, 420, 582, 221

[56] References Cited

U.S. PATENT DOCUMENTS

| | | | |
|---|---|---|---|
| 799,890 | 9/1905 | Claus | 83/635 X |
| 921,828 | 5/1909 | Graybill | 225/96.5 |
| 1,892,327 | 12/1932 | Buccicone et al. | 83/262 X |
| 1,930,330 | 10/1933 | Wattleworth | 83/582 X |
| 1,955,671 | 4/1934 | Coyle | 83/262 X |
| 2,155,730 | 4/1939 | Miller | 83/422 X |
| 2,390,376 | 12/1945 | Langenberg | 83/283 X |
| 2,495,394 | 1/1950 | Teskey | 83/628 |
| 2,737,239 | 3/1956 | Freund | 83/628 X |
| 2,926,557 | 3/1960 | Ford | 83/628 X |
| 3,029,775 | 4/1962 | Nicholson | 83/208 X |
| 3,817,139 | 6/1974 | Desai et al. | 83/635 X |
| 3,968,714 | 7/1976 | Kuchyt | 83/582 |

Primary Examiner—Frank T. Yost
Attorney, Agent, or Firm—Robert M. McManigal

[57] ABSTRACT

Apparatus for the high speed automatic cutting of measured lengths of a multiplicity of materials in which the material is guidingly fed from a supply source centrally of a feed path by a pair of adjustable feed rollers driven by a stepping motor that measures the length of material to be cut in terms of the cumulative steps of the stepping motor, and in which a reciprocable cutter knife is actuated in each cutting operation by a controlled single revolution of a connected drive shaft. A presser member supported for movement with the cutter knife engages the material in advance of the cutting blade and holds the material during cutting. The feed rollers are adjustable to a preset operative position and are spring urged to this position, but are arranged for independent manual movement to a wider separation of the rollers than in the preset position. The urging spring is also adjustable to vary its effective urging force. A unique gear train drivingly interconnects the rollers and is arranged to maintain their teeth in meshed driving relation during and at the adjusted positions of the spaced rollers.

2 Claims, 7 Drawing Figures

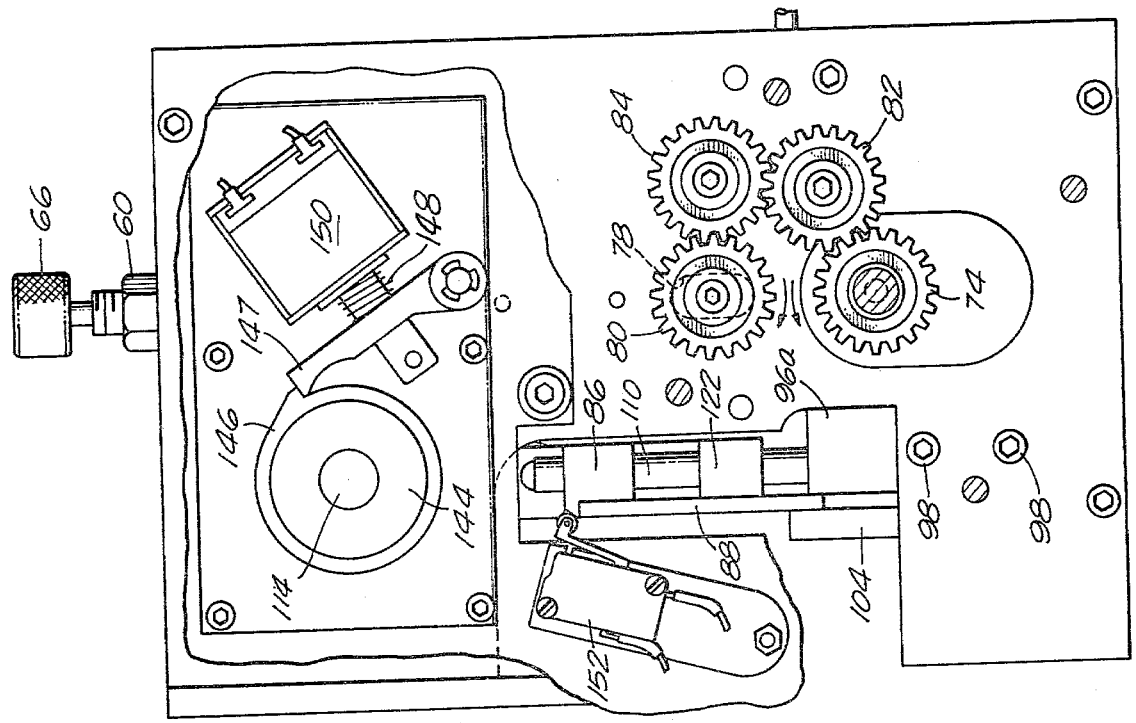
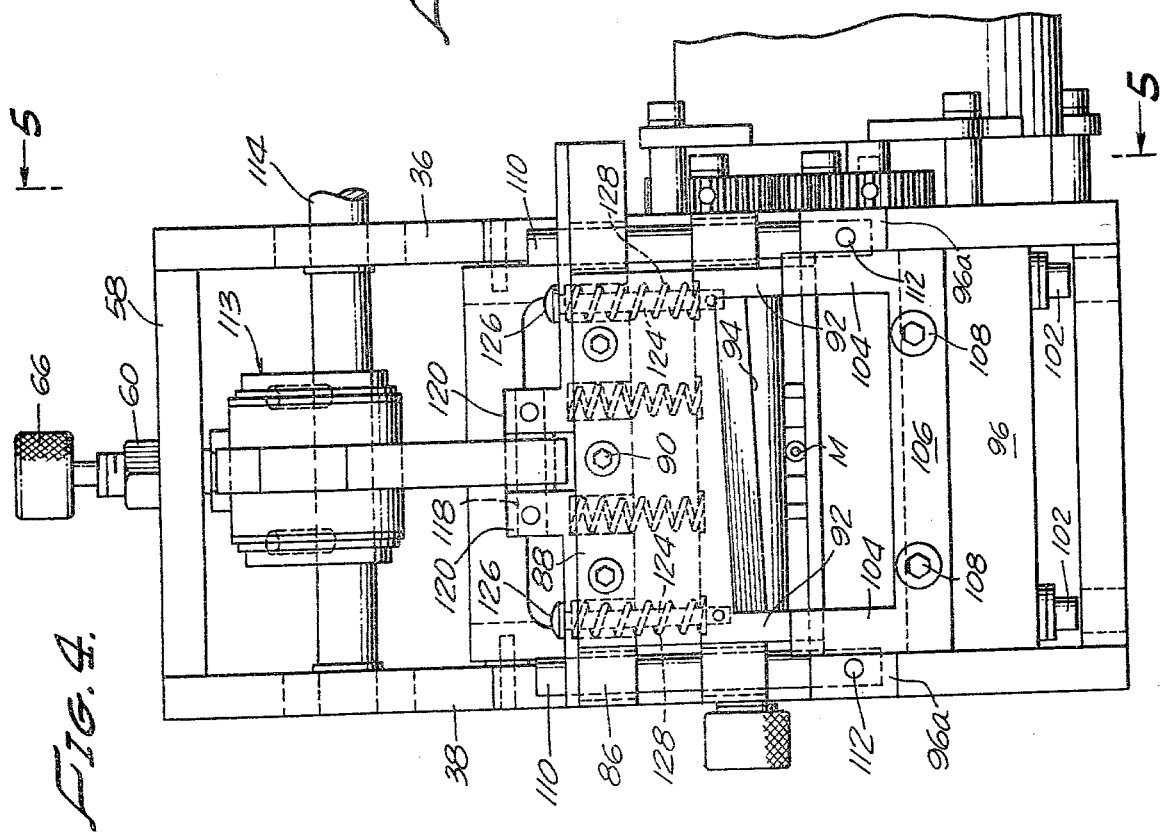

MULTIPLE PURPOSE CUTTER APPARATUS

BACKGROUND OF THE INVENTION

The present invention relates generally to the art of cutting measured lengths of material.

Heretofore, there has been a growing demand in industry for apparatus of the character of that which is conventionally available for the cutting and stripping of electric conductors, and which could be utilized for high speed, accurate and automatic cutting of a variety of extruded and otherwise formed materials of differing cross sectional configuration, and in which the materials may themselves differ considerably as to their inherent characteristics.

In some instances, for example, wire cutting and stripping apparatus of the character of that described and disclosed in U.S. Pat. No. 2,934,982, issued May 3, 1960 has been used for cutting predetermined lengths of small tubing. However, the use of this type of apparatus is extremely limited as to the materials and shapes, and is not entirely satisfactory for such use.

Other apparatus has heretofore been suggested, but such apparatus has, in the main, failed to satisfactorily solve the problems for one or more inherent reasons, including limitations as to sizes or shapes of the material, lack of accuracy, cost, etc.

The present invention proposes to solve the prior problems by providing a multiple purpose cutting apparatus which has a number of improvements and advantages over the known prior art arrangements, and broadly include:

1. Feed rollers that are adjustable for a variety of materials having different shapes and widths, and wherein the adjustable rollers are interconnected for unitary driving operation by a constantly meshed gear train.
2. The utilization of a stepper motor to drive the feed rollers, and control means utilizing a counter for measuring the cut lengths of the material in terms of the cumulative steps of the stepping motor.
3. A unique cutter and presser arrangement for holding the material during the cutting operation.
4. A unique control arrangement for limiting the rotation of the driving shaft for the cutter operating means to a single revolution for each cutting operation.
5. A novel guide means for laterally centering the material with respect to the central axis of the material feed path.

SUMMARY OF THE INVENTION

The present invention is more specifically concerned with the provision of cutter apparatus which may be utilized for the accurate cutting of elongate materials, which may vary widely as to construction and material characteristics, into predetermined cut lengths.

It is one object of the herein disclosed invention to provide an improved and unique apparatus for rapidly and automatically cutting a variety of materials into measured lengths.

A further object is to provide in such material cutting apparatus, improved means for the adjustment of a pair of material feeding rollers to preset positions to accommodate materials of different thicknesses, and in which the rollers are drivingly interconnected by a unique gear train arrangement in which the teeth of the gears remain in driving meshed relation in the respective adjusted preset positions of the rollers.

A further object is to provide apparatus according to the previous object in which the rollers are spring urged towards the preset positions, and in which manually operable means are provided for independently varying the preset positions of the rollers and the effective spring force at the preset positions.

A still further object is to provide in a material cutting apparatus an improved reciprocable cutter blade and presser member assembly, in which the presser member is arranged to engage the material in advance of the cutter blade and hold the material during the cutting operation.

Another object is to provide in a material cutting apparatus an improved reciprocal cutter blade which is actuated to effect a cutting operation by a single rotation of a connected driving shaft, and in which feed rollers for advancing and measuring the material to the cutter are driven by a stepping motor.

It is also an object to provide in a material cutting apparatus, unique manually operable guide means for centering materials of different widths with respect to the longitudinal central axis of the material feed path.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 4 is a side elevational view as seen from line 4—4 of FIG. 2 and showing details of the cutter and presser assembly means;

FIG. 5 is a back elevational view, as seen substantially along line 5—5 of FIG. 4, and showing the driving gear train interconnecting the feed rollers, and means for limiting the rotation of the cutter actuating shaft to one revolution for each cutting operation;

DESCRIPTION OF THE PREFERRED EMBODIMENT

Figure 1:
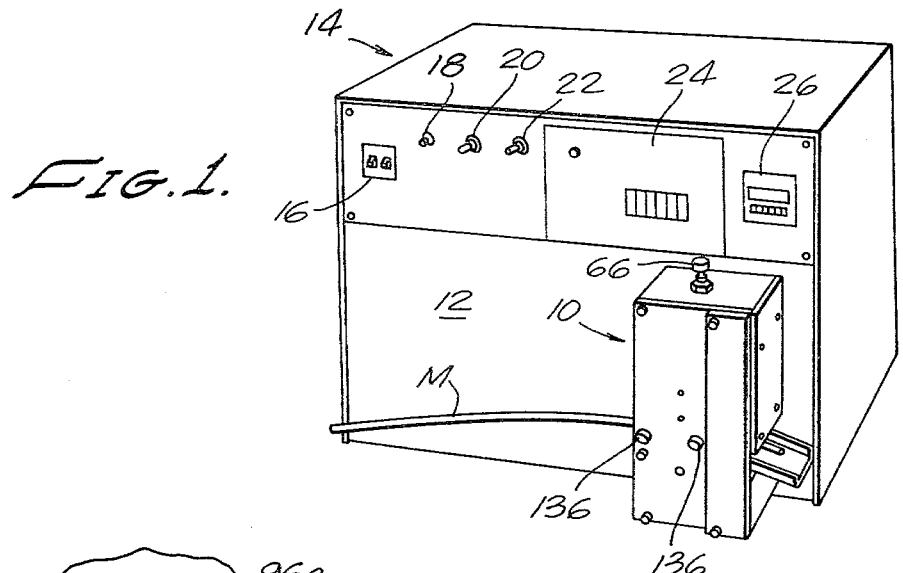
FIG. 1 is a perspective view of multipurpose cutting apparatus embodying the features of the present invention.

Referring now more specifically to the drawings, the apparatus of the present invention is disclosed in FIG. 1 as being incorporated within a housing 10 mounted upon the front panel 12 of a larger control cabinet 14 which also houses the driving motors and other accessory components of the apparatus. As thus arranged, the apparatus is adapted to receive on one side of the housing 10 an elongate strip of material M which is supplied from a storage source (not shown). The material is fed through the housing 10 where it is measured, and cut into predetermined lengths, the material discharge being from the opposite side of the housing 10. The apparatus is capable of cutting a variety of materials such as plastic tubing, wire, ribbon cable, tape and the like, to preset lengths. Operating controls are conveniently located on the front panel 12 and comprise a main power supply circuit breaker 16, an indicating light 18, a selector switch 20 for determining a single or multiple cuts of the material, a manual cycle switch 22, a length preset control 24, and a presetable batch counter 26.

Figure 2:
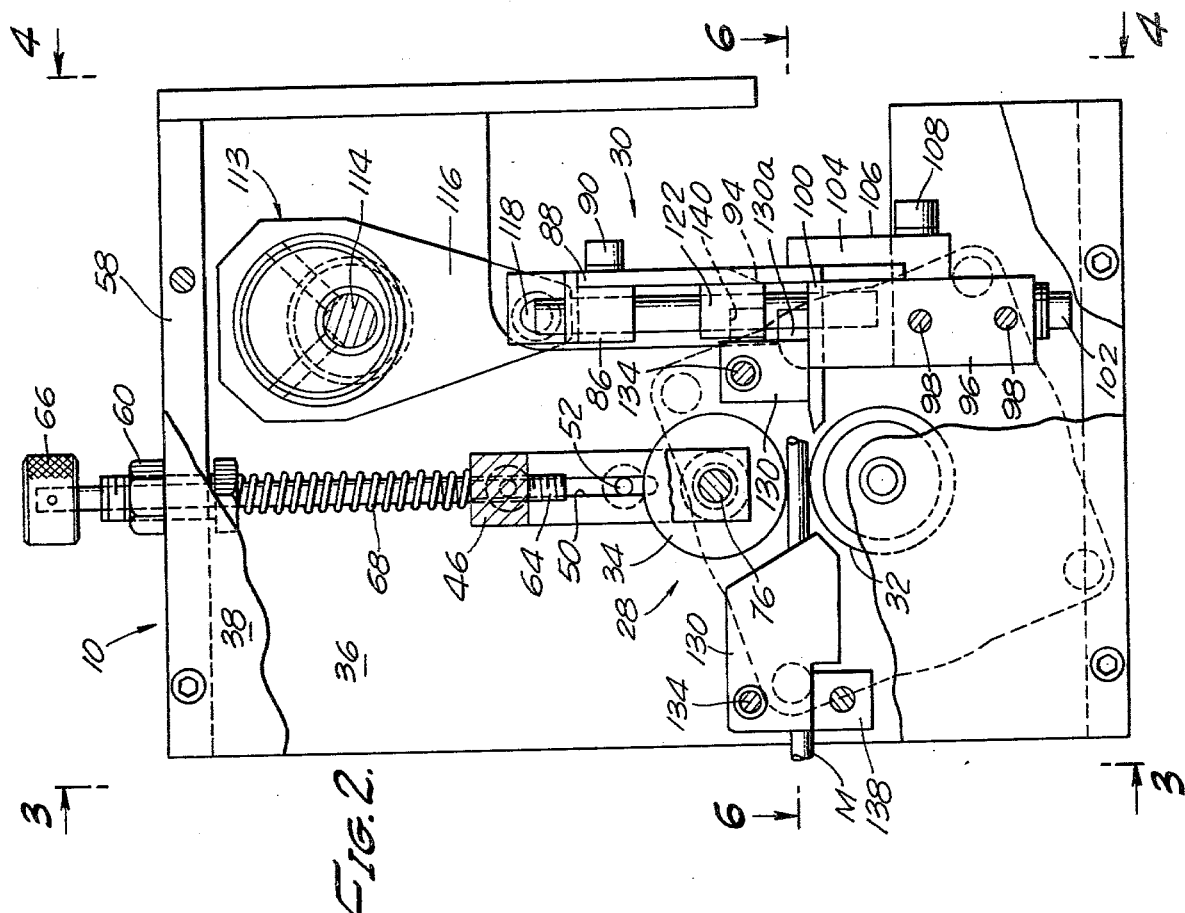
FIG. 2 is an enlarged front elevational view of the apparatus as mounted in its housing, portions of the housing being broken away to disclose structural features of the components and their interrelationship.

More specifically, as best shown in FIG. 2, the material M is advanced in a feed path by a feed roller assembly, as generally indicated at 28, and delivered to a cutter assembly, as generally indicated at 30, which is controlled by appropriate length counting mechanism and operated to sever the material into the predetermined cut lengths.

The feed roller assembly comprises a pair of feed rollers 32 and 34 which extend transversely of the feed path and have their axes of rotation in vertical alignment. Preferably, these rollers are surface coated with a carbide material to increase their gripping capability. Roller 32 has its opposite ends rotatably supported in spaced side frame members 36 and 38 of a main frame structure, as generally indicated at 40. The roller 34 has its opposite ends suitably supported in the side legs 42 and 44 which are interconnected by a bridging portion 46 to form a yoke structure, as generally indicated at 48. In order to provide for adjustable movements of the yoke 48 within the frame structure 40, the side legs 42 and 44 are formed in each case with a longitudinally extending guide slot 50 for the reception of one or more guide pins 52 which are fixedly supported in the associated side frames. Preferably, a shim washer 54 is interposed on each of the pins between the yoke leg and the adjacent frame member to provide an appropriate operating clearance.

Figure 3:
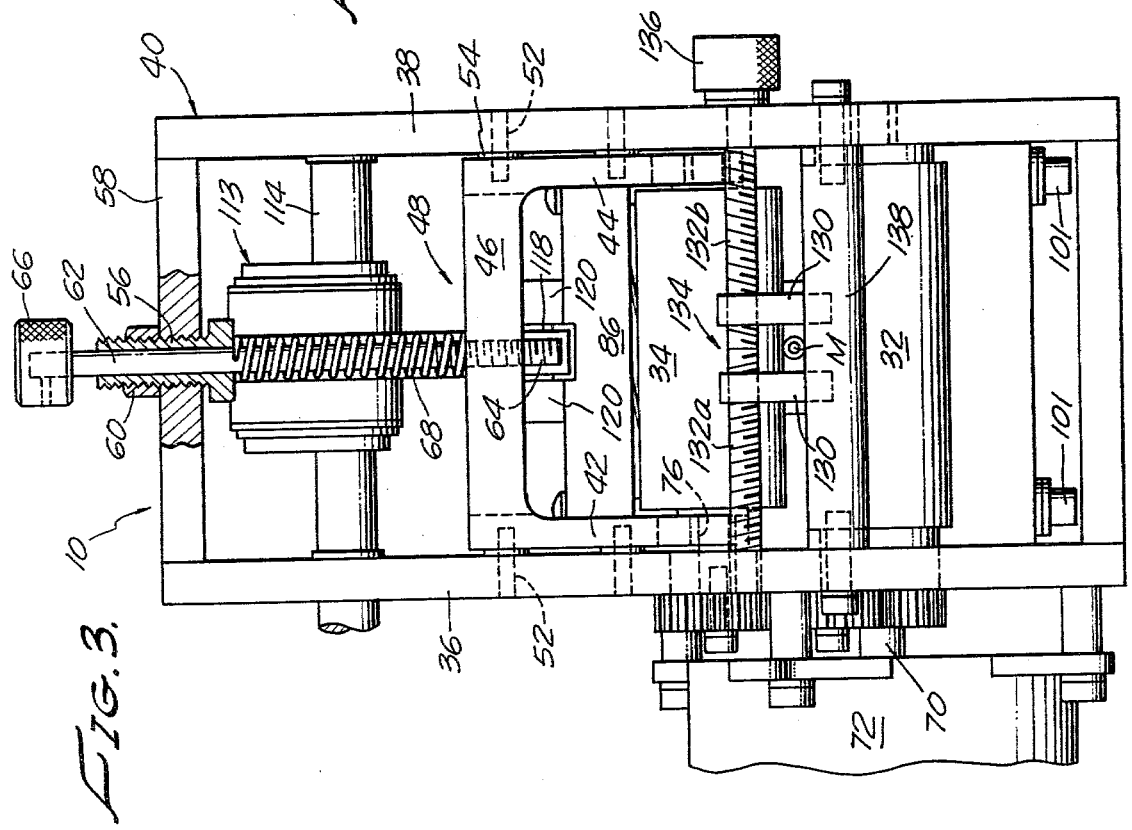
FIG. 3 is a side elevational view as seen from line 3—3 of FIG. 2, and showing details of the adjustable guide rollers and adjustable guide means for centering the entering material.

As best shown in FIG. 3, manually operable means are provided for adjusting the yoke 48 in order to vary the spacing between the roller 32 and the roller 34 for the reception of materials of different thicknesses therebetween, as well as to vary the pressure of the rollers against the material which is being fed. For this purpose, a bushing 56 is suitably mounted in external threaded engagement with a top frame member 58. This bushing has an inner end head portion adapted to operatively receive an adjusting tool, and at its outermost end is arranged to threadedly receive a lock nut 60. An elongate stem member 62 is slidably mounted in a longitudinally extending bore of the bushing and has an inner end 64 in threaded engagement with the yoke bridging portion 46. The outer end of the stem member 62 is provided with a knurled head portion 66 which is adapted for the manual manipulation of the stem. A compression coiled spring 68 surrounds that portion of the stem which extends between the bushing 56 and the bridging portion 46 of the yoke, this spring having one end in engagement with the bridging portion 46 and its other end in engagement with the head portion of the bushing 56. As thus arranged, it will be seen that the spring 68 will operate to urge the stem downwardly to a position in which the stem head portion 66 will engage with the outer end of the bushing 56 and thus predetermine an operative position of the roller 34 with respect to the roller 32. This operative position may, however, be manually changed to vary the spacing between the rollers simply by rotating the stem in the proper direction. The bushing 56 is also independently adjustable to vary the effective urging force of the spring 68 at the predetermined operative position. This is accomplished by simply releasing the lock nut 60 and by means of a suitable tool adjusting the axial position of the bushing 56 so as to increase or decrease the spring length according to the pressure desired. In the event that it is desired to momentarily increase the spacing between the rollers 32 and 34, as for example, when initially inserting a material between the rollers, this is accomplished simply by exerting a pulling force on the stem member 62 to raise the yoke against the action of the spring 68, which will return the roller 34 to its predetermined operative position upon release of the stem 62.

A unique driving connection is provided for the synchronous operation of the rollers 32 and 34 to rotate these rollers in opposite directions and to positively obtain a driving connection between the rollers at the adjusted shifted positions of the roller 34 with respect to the roller 32. As will be seen in FIG. 5, the roller 32 at one end is connected with a drive shaft 70 of a stepping motor 72 (FIG. 3) and also carries a driving gear 74. The roller 34 has an appropriate drive shaft 76 that extends through a slot 78 in the side frame 36 and is connected with a drive gear 80. The gears 74 and 80 are interconnected by a pair of idler gears 82 and 84 which are mounted on the side frame member 36 for rotation about fixed axes. It is important to note that in this gear arrangement the path of adjusting movements of the roller 34 with respect to the roller 32 is in tangential relation to the periphery of the gear 84 and that during such adjusting movements, the teeth of the gear 80 and the teeth of the gear 84 will be maintained in meshed relation and thus provide a positive driving connection between the rollers by means of the connected driving gear train.

Referring now to FIGS. 2 and 4, the cutter assembly 30 will be seen to comprise a head frame member 86 which forms a support for a downwardly extending cutter blade 88, this cutter blade being secured along its upper edge margin to the head frame member by means of a plurality of retaining screws 90. The cutter blade is of generally flat configuration and is formed with lower side leg portions 92 which extend beyond a cutting edge 94 of the blade and have overlapping engagement with the outer surface of an anvil supporting block 96 which extends transversely between the side frame members 36 and 38 to which it is secured at its opposite ends as by mounting screws 98. The block 96 provides a support for a superposed anvil 100 which is secured thereto by elongate fastening screws 102 in a position to coact with the cutting edge 94 during a cutting operation of the material. In order to prevent deflection of the cutting edge of the blade away from the anvil, which would impair the cutting operation, the side legs 92 of the cutter blade are guidingly restrained from deflection away from the anvil by means of overlying leg portions 104 of a guide member 106 which is secured to the adjacent face of the anvil supporting block 96 as by retaining screws 108.

The anvil supporting block 96 is formed with upper lateral extensions 96a in which the lower ends of upstanding laterally spaced guide rods 110 are secured in each case as by set screws, as indicated at 112.

The ends of the head frame member 86 are connected for guided reciprocable movements on the guide rods 110 during the cutting operations by means of an actuating mechanism which includes an eccentric, as generally indicated at 113, on a drive shaft 114. An actuating arm 116 is operatively connected at one end with the eccentric and has its other end pivotally connected by means of a pivot pin 118 having its opposite ends supported in spaced lugs 120 on the head frame member 86. As thus arranged, the eccentric will operate in one revolution of the drive shaft 114 to move the cutting blade through a cutting operation of the material.

Operatively associated with the cutter assembly, and controlled by the actuation of the cutter blade, are unique holding means for holding the material while being severed during the cutting operation. For this purpose, a presser member 122 is suspended from the head frame member 86 by means of a pair of supporting pins 124 which have their lowermost ends fixedly secured to the presser member and their upper end portions slidably mounted in the head frame member 86, and being formed in each case with a head portion 126 which is adapted to abut the associated upper surface of the head frame member 86 and thus limit downward movement of the presser member with respect to the head frame member. A plurality of compression springs 128 extending between the head frame member 86 and the presser member operate to normally urge these members into their limited separated position, but permit movement of the presser member towards the head frame member against the resisting pressure of these springs. In its normal position, the presser member, as shown in FIG. 2, extends slightly below the cutting edge 94 of the cutter blade and is thus adapted upon downward movement of the head frame member 86 to engage the material which is to be cut, slightly in advance of its engagement by the cutting edge 94.

Figure 6:
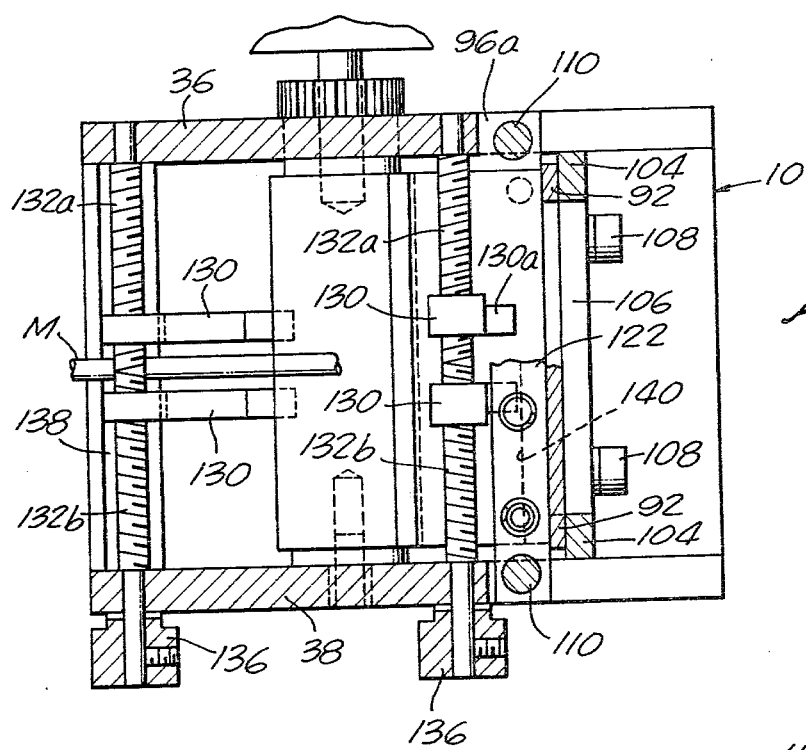
FIG. 6 is a transverse sectional view taken through the housing substantially on line 6—6 of FIG. 2, and showing the details of the guiding means for centering the material with respect to the longitudinal center line of the feed path.

As shown in FIG. 6, adjustable guide means are provided on both sides of the feed rollers for centrally positioning the material with respect to the longitudinal central axis of the feed path. Basically, the construction in each case is similar and comprises a pair of guide plates 130 which are respectively in threaded engagement with oppositely spiralled threaded portions 132a and 132b which extend in opposite directions from the longitudinal center of an actuating screw 134, this screw having its opposite ends rotatably supported in the side frame members 36 and 38, and one of these ends being provided with an actuating knob 136. As thus arranged, it will be apparent that by turning the actuating screw in opposite directions, the guide plates will be similarly moved either towards or away from the longitudinal center of the actuating screw which is coincident with the longitudinal central axis of the feed path. It will thus be seen that even if the width of the material is varied, the guide plates will always guidingly retain its feeding movement at a position in which its central longitudinal axis will be aligned with the central longitudinal axis of the feed path. Referring further to FIG. 2, it will be noted that in the guide means positioned on the left side of the feed rollers, the guide plates 130 are retained against rotation on the associated screw 134 by means of an underlying cross bar 138. In the case of the guide means on the other side of the feed rollers, it will be noted that the guide members are retained against rotation on the associated screw 134 by being in engagement with the underlying anvil 100. Also, in this case the guide members 130 have projecting portions 130a which are adapted to traverse a longitudinally extending cutout or recess 140 in the presser member 122, when the presser member is in its lowered operative position.

Referring to FIG. 5, means are provided for latchingly controlling the rotation of the drive shaft 114 to confine it to one revolution for each cutting operation. For such purpose, a driving motor 142 (FIG. 7) is connected with the drive shaft 114 through friction clutch mechanism 144 (FIG. 5) of conventional construction and which is associated with releasable latching means comprising a stop member 146 carried by the shaft 114. A releasable latch member 147 is normally urged by a spring 148 into the path of movement of the stop member in a manner to latch the shaft in a position in which the eccentric has operated the cutter blade to its raised position. The latch member is arranged to be operated by an associated solenoid 150, which upon being energized will move the latch member to a release position and permit one revolution of the shaft 114 and the movement of the cutting blade through a single cutting operation. A control switch 152 is operable in response to the movement of the head frame member 86 to a raised position of the cutter blade.

Figure 7:
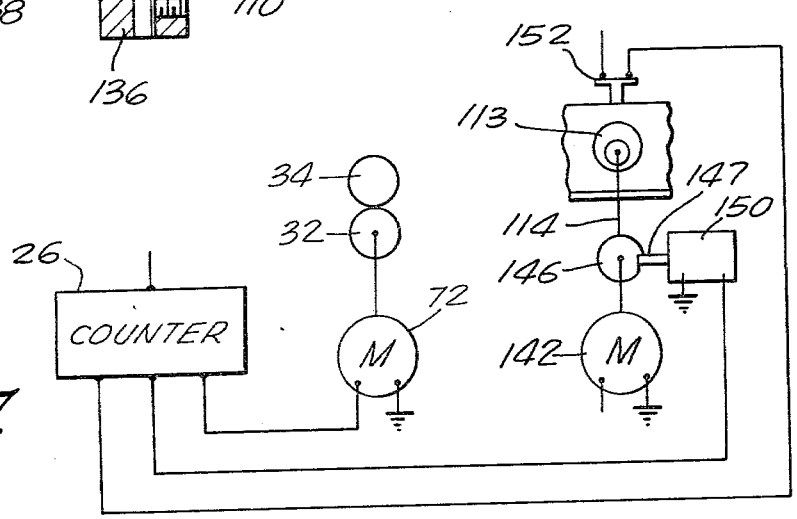
FIG. 7 is a view schematically illustrating the control means for measuring the length of the cut material, and for coordinating the cutting operation with such measurement.

With reference to the control as schematically shown in FIG. 7, this control is so designed that when the length control is preset and the batch counter set for the number of lengths which are to be produced, the contol will operate to energize the stepping motor 72 which will continue to operate the feed rolls and feed the material to the cutters. When the preset length is reached, the counter energizes the solenoid 150 to release the latch member 146 and thereby permit the shaft 114 to make one revolution and effect a material cutting operation. At the termination of the cutting operation, the switch 152 will close to initiate the start of another counting operation and cutting cycle.

From the foregoing description, it is believed that it will be appreciated that the heretofore outlined objects of the invention will be attained and that the apparatus embodying the described features provides inherent advantages over prior known devices for the production of cut lengths of materials.

Various modifications may suggest themselves to those skilled in the art without departing from the spirit of the disclosed invention and, hence, it is not desired to be restricted to the specific form shown or uses mentioned except to the extent indicated in the appended claims.

I claim:

1. Apparatus for cutting lengths of elongated materials, comprising:
   a main frame structure;
   a pair of drivingly interconnected rotatable feed rollers positioned in a material feeding path;
   a head frame member supported on said main frame for rectilinear movements towards and away from said feed path;
   cutting means including a cutting blade rigidly connected with said head frame member;
   means for moving the head frame member towards the feeding path to effect a cutting operation of material on the discharge side of said feed rollers;
   means including a resiliently mounted presser member carried by said head frame member extending across the material feed path for engaging and holding the material during a cutting operation, and being positioned to engage the material in advance of the cutting blade and between the cutting blade and said feed rolls;

laterally spaced guide rods which coact to slidably support the head frame member and the presser member;

means interconnecting the head frame member and presser member for relative movement on said guide rods to a limit position of separation, but permitting movement towards each other; and spring means urging the head frame member and presser member towards said limit position.

2. Apparatus for cutting lengths of elongated materials, comprising:

a main frame structure;

a pair of rotatable feed rollers positioned in a material feeding path, one of said rollers being mounted on said main frame for rotation about a fixed axis;

a yoke member rotatably supporting the other of said rollers;

means guidingly supporting said yoke member with respect to said main frame for adjusting movements to vary the spacing between said other roller and said one roller;

a head frame member supported on said main frame for rectilinear movements towards and away from said feed path;

cutting means including a cutting blade rigidly connected with said head frame member;

means for moving the head frame member towards the feeding path to effect a cutting operation of material on the discharge side of said feed rollers;

means for holding the material during a cutting operation; and means for adjusting the operative position of said yoke, comprising:

a bushing having external threaded engagement with a top frame member and an inner end head portion adapted to operably receive an adjusting tool;

a lock nut having threaded engagement with the outer end of said bushing;

an elongate stem member slidably mounted in a bore of said bushing, said stem having an inner end in threaded engagement with said yoke and an outer end providing a head portion adapted for manual manipulation of the stem; and a compression spring surrounding said stem with one end engaging said yoke and the other end engaging the inner head portion of said bushing, said spring being operative to urge said stem head portion into a position of engagement with the outer end of said bushing whereupon stem rotation will adjust the yoke to a predetermined operative position, and rotation of the bushing will independently adjust the urging force of the spring at said operative adjusted position of said yoke.

* * * * *